…

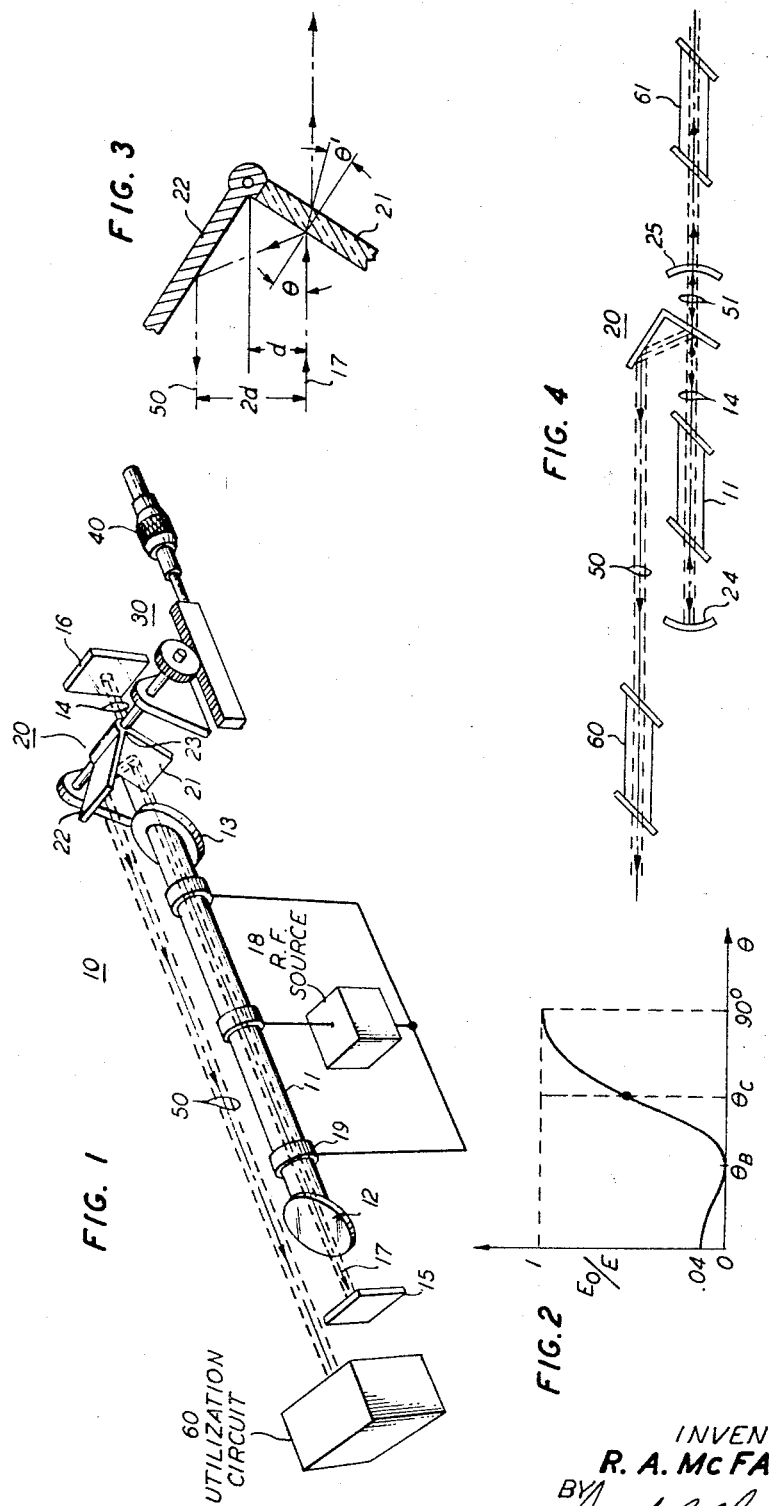

United States Patent Office 3,448,404
Patented June 3, 1969

3,448,404
NONTRANSLATING VARIABLE OUTPUT COUPLER FOR OPTICAL MASERS
Ross A. McFarlane, Mountainside, N.J., assignor to Bell Telephone Laboratories, Incorporated, New York, N.Y., a corporation of New York
Filed Dec. 22, 1965, Ser. No. 515,791
Int. Cl. H01s 3/05
U.S. Cl. 331—94.5                2 Claims

ABSTRACT OF THE DISCLOSURE

A nontranslating variable output coupler includes a thin slab of material transparent to laser radiation placed in the optical cavity near, but not at, Brewster's angle. An opaque plane mirror is joined at right angles to the thin slab and the assembly is pivoted about an axis through its line of intersection. Energy is coupled from the cavity in an amount related to the deviation of the thin slab from Brewster's angle and along a path parallel to the resonator axis.

---

This invention relates to optical maser devices and more particularly to devices for coupling energy from an optical cavity resonator.

In the active medium of an optical maser a net stimulated emission of radiation occurs only in a condition that is variously referred to as population inversion, negative temperature, or a state of negative absorption. This nonequilibrium condition is characterized by the existence of a pair of atomic or molecular energy levels or states of which the higher is more densely populated than the lower. When this condition occurs, the medium is capable of releasing energy in the form of coherent optical radiation having a characteristic "transition frequency" and, if an electromagnetic wave at the given transition frequency is passed through the medium, the medium transfers some of its energy to the electromagnetic wave thereby amplifying the wave. When the medium, in the same condition of population inversion, is confined within an optical cavity resonator, the system can act as a generator of electromagnetic waves at the transition frequency.

The construction of a typical generator, now generally referred to as "optical maser" or "laser," then, involves the placement of a suitably prepared medium, one which exhibits gain at the desired frequency, in a resonant cavity. In a gas laser, for example, this cavity generally consists of two reflectors, typically plane or spherical mirrors, placed at the ends of a gas discharge tube.

For the visible and near infrared optical regions, mirrors having a reflectivity of about ninety-nine percent are prepared by evaporation on an optically polished substrate of a plurality of quarterwave layers of alternately high and low refractive index material. These mirrors transmit about one-half percent of the radiation incident upon them and this transmitted energy is the useful output beam. Oscillation takes place within the cavity when the optical gain of the medium is sufficient to overcome the losses represented by the energy transmitted through the mirrors and the losses resulting from scattering and diffraction.

Another technique well known in the art for obtaining an output beam from an optical cavity resonator is the utilization of an end reflector having a circular aperture concentric with the collimated beam. A portion of the beam incident upon the mirror is then transmitted through the aperture as useful output.

Power outputs available from such optical cavity resonators operating in the visible and near infrared optical regions are typically 1–100 milliwatts depending on the medium used and the size of the cavity. For a particular medium and cavity configuration, however, it has not been readily possible to vary the amount of energy extracted as useful output. The transmissivity of the end reflectors in one case or the diameter of the aperture in another is fixed for a given optical maser. In order to change the amount of energy extracted from the cavity it is generally necessary to change these parameters by the utilization of different end reflectors. This technique is, of course, cumbersome and does not lend itself to accurate and continuous variations in the amount of energy extracted.

Other output coupling arrangements utilized in the prior art comprise various combinations of dielectric prisms. In a typical arrangement, two identical right angle prisms are used as the end reflectors of an optical cavity. A third right angle prism is positioned adjacent one of the first prisms at a distance from it less than one wavelength of the energy emitted by the optical maser. By the utilization of the phenomenon of frustrated total internal reflection, the amount of energy extracted can be varied. The output beam emerges from the third prism and travels and travels to the utilizing means. In such arrangements, however, as the distance between the adjacent prisms is changed in order to vary the transmittance, the position of the output beam also changes. Consequently it is not possible to fix the location of the utilization means, a situation not conducive to the operation of useful optical systems.

It is an object of this invention to couple variable amounts of energy as useful output from an optical cavity resonator.

Another object of this invention is to permit the location of the utilizing means to remain fixed.

The above objects are realized in accordance with the invention by the utilization of a thin slab of material transparent to maser radiation and placed in the optical cavity near, but not at, Brewster's angle. An opaque plane mirror is joined at right angles to the thin slab and the assembly is pivoted about an axis through its line of intersection.

A characteristic of this invention is that energy is coupled from the cavity in an amount related to the deviation of the thin slab from Brewster's angle.

Another characteristic of this invention is that the output beam is first reflected by the thin slab and subsequently reflected by the opaque plane mirror into a path parallel to the axis of the cavity and at a distance from it equal to twice the distance of the pivot from the cavity axis. Coupling is varied by rotating the slab-mirror assembly and it follows from geometrical optics that the position of the output beam remains unchanged.

The above and other objects of the invention, together with its various features and advantages, can be easily understood from the following more detailed discussion, taken in conjunction with the accompanying drawings, in which:

FIG. 1 is a perspective view of an embodiment illustrative of the invention;

FIG. 2 is a plot of energy coupled versus the angle of incidence;

FIG. 3 is a diagrammatic sketch of the invention; and

FIG. 4 is a diagrammatic drawing of a second embodiment of the invention.

The various optical masers differ chiefly in the medium used and the mechanism by which a population inversion is achieved. Although in the following description this invention is disclosed with specific reference to a gas optical maser, other media, such as, for example, a ruby crystal, may be utilized as well.

Turning now to FIG. 1, there is shown a gas optical maser 10, comprising an elongated hollow quartz tube 11 defining an enclosed space for containing a gaseous active medium. A light beam path through the tube 11 is defined by transparent windows 12 and 13 inclined at Brewster's angle to the path of the light beam 14. By placing the windows at Brewster's angle, light polarized in the plane of incidence is transmitted without reflection. When a gas optical maser is to be used as an oscillator, a pair of reflectors 15 and 16 are positioned adjacent the windows 12 and 13. The reflectors 15 and 16, which may be either flat or curved, thus define an interferometer cavity having a central axis 17.

Disposed between the window 13 and the reflector 16 is a slab-mirror assembly 20 for extracting energy from the light beam 14 as useful output. The assembly 20 alternatively may be placed between the window 12 and the reflector 15. The assembly 20 comprises a thin slab 21 of material, typically silicon, germanium, or an alkali halide for infrared frequencies, or quartz for visible frequencies, transparent to the maser radiation and oriented near, but not at, Brewster's angle with respect to the cavity axis 17. An opaque plane mirror 22 is placed at right angles to the thin slab 21 and the assembly 20 is pivoted about an axis through its line of intersection 23 by means of a rack and pinion arrangement 30 controlled by a micrometer 40. When the normal to the thin slab 21 is at Brewster's angle to the axis 17, the thin slab is actually transparent since no energy is reflected from beam 14. At all other orientations of the thin slab 21 a portion of the energy in beam 14 is reflected as indicated by FIG. 2. In one typical mode of operation of the device, radio frequency energy from source 18 is applied to the gaseous medium, typically a mixture of helium and neon gases, by means of electrodes 19, thereby causing an electrical discharge to take place in the gaseous medium within the tube 11. The energy from the internal discharge produces a population inversion in the gaseous medium which subsequently radiates energy coherently in a continuous stream, the resultant energy beam 14 being reflected back and forth between reflectors 15 and 16 and growing in intensity upon each traversal of the gaseous medium. During each passage of energy beam 14 between reflectors 15 and 16, a traversal of windows 12 and 13 as well as a reflection from thin slab 21 and subsequent reflection from opaque mirror 22 occurs. The energy thus extracted from energy beam 14 by reflection is the useful output beam 50.

Energy is coupled from beam 14 in an amount related to the deviation of the thin slab 21 from Brewster's angle. More specifically, if E is the energy beam 14 and $E_o$ is the energy reflected by thin slab 21, then $$\frac{E_o}{E} = \left[\frac{\tan(\theta-\theta')}{\tan(\theta+\theta')}\right]^2 \quad (1)$$

where $$\theta' = \sin^{-1}\left[\frac{1}{n}\sin\theta\right] \quad (2)$$

and $\theta$ is the angle of incidence, the angle the normal to slab 21 makes with the cavity axis 17; $\theta_B$ is Brewster's angle; and $n$ is the index of refraction of the slab material. Equation 1 is plotted in FIG. 2. Thereon is indicated a critical orientation angle $\theta_C$ of the slab 21 beyond which the gain per pass of the optical cavity resonator is insufficient to overcome the losses of the system represented by scattering, diffraction and energy reflected by the slab 21. Thus, if $\theta > \theta_C$, oscillation will cease. All orientation angles between zero and $\theta_C$, with the exception of Brewster's angle, will be hereinafter denoted as effective orientations.

The fraction of energy coupled from the cavity may be controlled by means of the micrometer 40 and the rack and pinion 30. This arrangement allows for accurate and continuous variation in the amount of energy extracted, an advantage not afforded by prior art techniques utilizing end reflectors which are partially transmissive or have circular apertures. Other control means can be used, if so desired.

A further advantage of the present invention is that the position of the output beam 50 remains unchanged as coupling is varied by rotating the slab-mirror assembly 20. Referring to FIG. 3, it follows from geometrical optics that the output beam 50 is reflected from the slab-mirror assembly 20 into a path parallel to the cavity axis 17 and at a distance from it equal to twice the distance of the line of intersection 23 from the cavity axis 17. Consequently, the position of the output beam 50 incident upon the utilization means 60 also remains unchanged as coupling is varied, thereby to allow the location of the utilization means 60 to be fixed for all orientations of the slab-mirror assembly 20, an important advantage in the operation of practical optical systems.

A typical embodiment of this invention as a beam-splitting device is shown in FIG. 4. Energy beam 14 is split into two beams 50 and 51. Beam 50 undergoes a double reflection by slab-mirror assembly 20 and is incident upon utilization means 60, a coherent light amplifier, whereas a portion of beam 51 passes through partially transmissive end reflector 25 and is incident upon coherent light amplifier 61. Beam 50 might be used, for instance, to derive a local oscillator signal, and beam 51 to provide a carrier signal.

In all cases it is understood that the above-described arrangements are illustrative only of many specific embodiments which can represent application of the principles of the invention and are not to be construed as a limitation. Numerous variations and modifications of the invention are possible and may be made by those skilled in the art to which it pertains without departing from its scope and spirit.

What is claimed is:

1. An optical maser apparatus comprising
   an elongated optical resonator,
   a negative temperature medium disposed within said resonator,
   means disposed within said resonator for varying the amount of optical energy coupled from said resonator, said means being oriented to deflect a portion of the energy propagating along the resonator axis into a path parallel to and at a fixed distance from the axis for all effective orientations of said energy coupling means, said energy coupling means comprising an assembly having first and second reflective members disposed normal to one another and means for rotating said assembly about an axis through the line of intersection of said members, said first reflective member being partially transparent to the energy and being disposed at an angle to said resonator axis, said second reflective member being substantially opaque to the energy, the amount of energy coupled from said resonator being related to the angular deviation of said first reflective member from Brewster's angle with respect to said resonator axis.

2. An energy coupling device for use with coherent light apparatus having optical energy propagating along an axis thereof, said device comprising
   means for varying the amount of energy coupled from said coherent light apparatus, said means being oriented to deflect a portion of the energy propogating along said axis into a path parallel to and at a fixed distance from the axis of the apparatus for all effective orientations of said energy coupling means, said energy coupling means comprising an assembly having first and second reflective members disposed normal to one another, and means for rotating said assembly about an axis through the line of intersection of said members, said first reflective member being partially transparent to the optical energy and said second reflective member being substantially opaque to the energy, the amount coupled from said apparatus being related to the angular deviation of said first reflective member from Brewster's angle with respect to the axis of said apparatus.

References Cited

UNITED STATES PATENTS 3,243,724  3/1966  Voylsteke ____ 331—94.5

RONALD L. WIBERT, *Primary Examiner.*

V. P. McGRAW, *Assistant Examiner.*

U.S. Cl. X.R.

350—299